(12) United States Patent
Loyan et al.

(10) Patent No.: US 11,008,699 B2
(45) Date of Patent: May 18, 2021

(54) FABRIC HAVING MOISTURE MANAGEMENT FEATURES

(71) Applicant: Sanko Tekstil Isletmeleri San. Ve Tic. A.S., Inegol-Bursa (TR)

(72) Inventors: Kenan Loyan, Inegol-Bursa (TR); Mehmet Avsar, Inegol-Bursa (TR); Leyla Zengi, Inegol-Bursa (TR); Turan Eren Gül, Inegol-Bursa (TR); Fatma Korkmaz, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 0 days.

(21) Appl. No.: 15/735,344

(22) PCT Filed: Jul. 21, 2016

(86) PCT No.: PCT/EP2016/067470
§ 371 (c)(1),
(2) Date: Dec. 11, 2017

(87) PCT Pub. No.: WO2017/013232
PCT Pub. Date: Jan. 26, 2017

(65) Prior Publication Data
US 2018/0179701 A1     Jun. 28, 2018

(30) Foreign Application Priority Data

Jul. 21, 2015   (EP) .................................. 15177759

(51) Int. Cl.
*B32B 5/02*     (2006.01)
*D06M 23/16*    (2006.01)
(52) U.S. Cl.
CPC ............. *D06M 23/16* (2013.01); *B32B 5/024* (2013.01); *D06M 2200/12* (2013.01);
(Continued)

(58) Field of Classification Search
CPC ....... Y10T 442/2164; Y10T 428/24802; Y10T 428/2481; D06M 2200/10;
(Continued)

(56) References Cited

U.S. PATENT DOCUMENTS

| 2004/0058072 A1* | 3/2004 | Rearick ..................... B32B 5/26 |
| | | 427/324 |
| 2005/0101209 A1 | 5/2005 | Li et al. |
| 2010/0316842 A1 | 12/2010 | Tuteja et al. |

FOREIGN PATENT DOCUMENTS

| CN | 101649558 | 2/2010 |
| CN | 104695235 | 6/2015 |

(Continued)

OTHER PUBLICATIONS

Espacenet translation of JP-10138454-A, accessed on Nov. 29, 2018. (Year: 1998).*

(Continued)

*Primary Examiner* — Marla D McConnell
*Assistant Examiner* — Christine X Nisula
(74) *Attorney, Agent, or Firm* — Silvia Salvadori (57) ABSTRACT

A fabric with moisture management properties has a pattern of hydrophobic areas comprising at least one hydrophobic agent provided at least on the first side of the fabric and at least one hydrophilic agent which is provided in a pattern on at least some regions of said first side of the fabric, whereby said first side has a pattern of hydrophobic areas and a pattern of hydrophilic areas to transfer the moisture from the first side to the second side.

15 Claims, 5 Drawing Sheets

(52) U.S. Cl.
CPC .... *D06M 2400/01* (2013.01); *Y10T 442/2164* (2015.04); *Y10T 442/2484* (2015.04); *Y10T 442/30* (2015.04)

(58) Field of Classification Search
CPC .............. D06M 2200/12; D06M 23/16; D10B 2401/021; D10B 2401/022; A41D 31/125; A61F 2013/00319; A61F 2013/00323; A61F 2013/51033; A61F 2013/5103; A41B 2400/60; A41B 2400/62; B32B 2307/728; B32B 2307/73
USPC ................. 428/103, 195.1, 196; 442/118, 79
See application file for complete search history.

(56) References Cited

FOREIGN PATENT DOCUMENTS

| | | |
|---|---|---|
| EP | 1116813 | 7/2001 |
| JP | 10138454 A * | 5/1998 |
| JP | H10138454 | 5/1998 |
| JP | 2007162150 | 6/2007 |
| JP | H10138454 | 5/2008 |
| JP | 2013133572 | 7/2013 |
| WO | 0227088 | 4/2002 |
| WO | 2007059590 | 5/2007 |

OTHER PUBLICATIONS

Espacenet translation of JP-2013133572, accessed on Nov. 29, 2018. (Year: 2013).*
Higg MSI, Pad-Dry-Cure or Exhaust-Dry-Cure. Retrieved from https://msi.higg.org/process/140/pad-dry-cure-or-exhaust-dry-cure. (Year: 2015).*
International preliminary report on patentability dated Jan. 23, 2018 for application No. PCT/EP2016/067470.
International search report and written opinion dated Nov. 3, 2016 for application No. PCT/EP2016/067470.
European Search Report dated Nov. 25, 2015 for priority application No. 15177759.6.
First Office Action dated Dec. 3, 2019 by the CN patent office for corresponding CN application No. 201680042182.6.
Local agent letter reporting the First Office Action dated Dec. 3, 2019 by the CN patent office for corresponding CN application No. 201680042182.6.
Office Action dated Jan. 28, 2020 by the Barzilian Patent Office issued for the BR patent application BR112018000480-4.
Local Agent letter reporting Office Action dated Jan. 28, 2020 by the Barzilian Patent Office issued for the BR patent application BR112018000480-4.
Office Action dated Apr. 21, 2020 by the JP patent office for corresponding JP application No. 2018-502797 and relevant local agent comments.
Office Action dated Dec. 3, 2019 by the CN patent office for corresponding patent application No. 201680042182.6 and relevant reporting letter of the CN local agent.
Office Action dated Aug. 17, 2020 by the CN patent office for corresponding CN application No. 201680042182.6 and relevant local agent comments.

* cited by examiner

FABRIC HAVING MOISTURE MANAGEMENT FEATURES

RELATED APPLICATIONS

This application is the US national phase application of international application number PCT/EP2016/067470, filed 21 Jul. 2016, which designates the US and claims priority to European application EP 15177759.6 filed 21 Jul. 2015, the contents of each of which are hereby incorporated by reference as if set forth in their entireties.

FIELD OF THE INVENTION

The present invention relates to fabrics having moisture management features. In particular, it relates to fabrics and garments able to transfer sweat and moisture quickly from one side to the other side of the fabric, providing the fabric with fast drying properties, in order to keep the user, (i.e., the wearer), of a garment made with such a fabric dry and cool.

BACKGROUND ART

The management of the moisture deriving from the wearer's body is a crucial aspect in the production of fabrics, especially in the production of fabrics for sport garments.

In particular, fabrics should be designed and structured in order to promote the absorption of moisture and sweat from the skin of the user (at the level of the inner surface of the fabric), and to allow the evaporation of the absorbed moisture at the level of the outer surface of the fabric.

Both natural (e.g. cotton) and synthetic materials, however, show some problems and limitation in managing the moisture from the body of the user. For example, cotton fabrics present a variety of problems in the managing of the moisture, due to the high absorbency of the cotton.

In fact, cotton fabrics efficiently absorb the moisture and the sweat from the skin of the users, but the evaporation of the absorbed moisture is difficult. A cotton garment, when used for example during sport activities, quickly absorbs the sweat, rapidly drenching, and thus becomes heavy and sticks to the skin. Additionally, wet cotton fabrics and garments take long time to dry. As an alternative to cotton, synthetic fibers can be used in fabrics and garments, in particular for sporting apparel.

Hydrophobic synthetic fibers are chemically treated to produce wicking of liquid moisture in hydrophobic thermoplastic synthetic fabrics and garments. In this way, absorption of moisture is allowed in per se non-absorbing fabrics. However, these fabrics are generally less comfortable with respect to cotton fabrics.

WO 02/27088 discloses a fabric which is treated only with a hydrophobic agent to provide a hydrophobic pattern. The wicking effect is due to the hydrophilic nature of the fibers used, namely cotton fibers, that absorb moisture in the areas free from hydrophobic agent.

WO 2007/059590 discloses a fabric which is treated with hydrophobic and/or hydrophilic agents. In particular, WO 2007/059590 discloses that the entire inner face of the fabric is treated with a hydrophobic agent. The hydrophobic agent is confined to the inner face, or can penetrate the inner face, such that the hydrophobic agent can extend from the inner face toward the outer face, without forming part of the outer face. Moreover, WO 2007/059590 discloses that the hydrophilic agent is confined to the outer face, or can penetrate the outer face, such that the hydrophilic agent can extend from the outer face toward the inner face, without forming part of the inner face.

However, the fabrics known in the art present several problems.

In general, the so-called wicking effect, i.e. the transfer of moisture from the inner side of the fabric (the side of the fabric which is in contact with the user's body) to the outer environment is not efficient enough.

Another problem, common to all known treated fabrics, is that the effect of moisture management is greatly reduced, or almost lost, in fabrics that are elastic, or stretchable, fabrics.

Therefore, there is a need for fabrics, in particular elastic fabrics, having improved moisture management features.

SUMMARY OF THE INVENTION

An aim of the invention is to provide moisture management features to a fabric, in particular an elastic fabric, so that the fabric has an efficient moisture transfer from the inner side of the fabric (or garment) to its outer side.

Another aim of the present invention is to provide a fabric which keeps the user of a garment made with said fabric (i.e., the fabric's wearer) dry and cool, even at high temperatures or during or after exercise, in order to avoid the feeling of wetness and the relevant discomfort.

Also another aim of the present invention is to provide a fabric which quickly dries, thus providing to the user a comfortable wearing experience.

A further aim of the present invention is to provide a process for producing a fabric with moisture management features, as mentioned above.

Still a further aim of the present invention is to provide a garment comprising a fabric with moisture management features, as mentioned above.

These and other aims are achieved by a fabric according to claim 1, that can be produced by means of a process according to claim 14. Another object of the invention is a garment that includes a fabric as above defined, according to claim 20.

An object of the present invention is a fabric having: a first side, a second side, a body extending from said first side to said second side; at least one hydrophobic agent, which is provided at least on said first side of said fabric, as a pattern of hydrophobic areas, wherein said fabric comprises at least one hydrophilic agent, which is provided on at least some regions of said first side of the fabric, whereby said first side has a pattern of hydrophobic areas and a pattern of hydrophilic areas, to transfer the moisture from said first side to said second side.

As above mentioned, a fabric according to the invention has a first side, that is the side which contacts the skin of the user, that is provided with a pattern of hydrophobic areas and a pattern of hydrophilic areas. In other words, the side of the fabric which will be the one in contact with the user's skin, comprises a plurality of different areas, wherein some of said areas are provided with at least one hydrophobic agent, and other areas are provided with at least one hydrophilic agent but with no hydrophobic agent, i.e. they are free from hydrophobic agents.

In a fabric according to the invention, a moisture contacting the first side of the fabric is repelled by the areas of the first side having a hydrophobic agent and is forced to move to the hydrophilic areas of the first side (i.e. the inner side) of the fabric, where it is absorbed by the body of the fabric and transferred from the first side of the fabric to the second side of the fabric, where the evaporation of the moisture occurs.

Thus, the invention provides a fabric wherein a first side has areas containing at least one hydrophobic agent and areas containing at least one hydrophilic agent and free from hydrophobic agents; preferably, the areas containing one or more hydrophobic agent also contain a hydrophilic agent. The areas containing at least one hydrophobic agent show hydrophobic properties even though a hydrophilic agent is present in the same areas; the areas containing only hydrophilic agent(s) show hydrophilic properties.

The other side of the fabric, i.e. the second side, preferably has only hydrophilic properties. The body of the fabric may have hydrophobic regions containing both hydrophobic and hydrophilic agents.

In a garment made of or containing a fabric according to the invention, the first side of the fabric is the side that contacts the user's body. When the garment is used, moisture and/or sweat generated on the skin of the user, for example during exercise, or because of hot temperatures, will contact the inner side of the garment, i.e. the first side of the fabric.

The simultaneous presence, on the first side of the fabric, of hydrophobic areas, and hydrophilic areas, allows a quick removal and transport of the moisture from the skin of the user to the second side of the fabric which is the outer side of the fabric, for example, in contact with the external environment. Additionally, since the fabric of the present invention comprises at least one hydrophilic agent and at least one hydrophobic agent, preferably cross-linked or thermofixed to the fabric, the fabric is able to keep unaltered its moisture management properties, even after a long use and wear. In particular, for example, the application of a hydrophilic agent first to the whole fabric, makes the pattern of hydrophobic areas to be bound to the fabric stronger, i.e. more resistant to the use and wear.

According to the invention, all types of fabrics and fibres are suitable to be used; for example, both natural and/or synthetic fibers can be used to produce a fabric according to the invention. In an exemplary embodiment, the fabric has yarns, namely warp yarns and weft yarns, that are made of fibers, or yarns, namely warp yarns and weft yarns, containing fibers, that are per se provided with hydrophilic properties; exemplary hydrophilic yarns are natural yarns such as e.g. cotton yarns and woolen yarns, and may be used as warp and/or weft yarns.

According to an aspect of the invention, the fabric is an elastic fabric. In the present invention the wording "elastic fabric" is used to refer to fabrics having elastic properties, i.e. fabrics that can be stretched (i.e. elongated) and that will substantially recover the initial status (such as length) once the stretching force is no longer applied to the fabric. Elastic fabrics are known in the art and usually comprise a plurality of elastic yarns; for example, the known elastic woven fabrics normally comprise elastic yarns at least as weft yarns or as warp yarns.

In a preferred embodiment, the fabric of the invention is a fabric wherein the regions where said hydrophilic agent is provided, are at least in part overlapping the hydrophobic areas, to provide hydrophobic areas.

In other words, in a preferred embodiment, there are areas of the fabric where both hydrophobic and hydrophilic agents are present (namely, have both been applied); these areas show a hydrophobic behavior. Therefore, according to an aspect of the invention, it is possible to provide a desired hydrophobic pattern in, or over, portions of the regions where a hydrophilic agent has been already provided.

In a possible embodiment, the hydrophobic areas, are in the form of a film. In other words, individual shapes which form the pattern of hydrophobic areas are preferably in the form of a film, preferably a continuous film. More specifically, the fabric is preferably not covered by a perforated continuous film for its entirety, rather hydrophobic areas are provided, at least on the first side of the fabric of the invention, as individual portions of a continuous film.

Advantageously, as above mentioned, when a pattern of hydrophobic areas is provided according to the present invention, the fabric can be stretched and/or deformed, for example up to 100% of its initial length, without losing its effectiveness in moisture management, i.e. without jeopardizing the fabric's (or garment) wicking effect.

It, is has been observed that, when a pattern of hydrophobic and hydrophilic areas according to the invention is provided to an elastic fabric, preferably an elastic woven fabric, the pattern of hydrophobic areas can be stretched and/or deformed without losing its effectiveness in moisture management, i.e. without jeopardizing the fabric's (or garment) wicking effect.

According to embodiments, the fabric of the invention may be an elastic fabric which is stretchable in weft direction, or in warp direction or both weftwise and warpwise. In other words, the fabric of the invention may be an elastic fabric (namely a woven fabric) that can be stretched along one direction (e.g. weft direction or warp direction) or a fabric that can be stretched along both the warp direction and the weft direction.

The fabric of the invention is therefore suitable to be used for the production of a great variety of garments, such as garments for daily use, as well as garments for sport and physical exercising.

According to embodiments, the garments comprising the fabric of the invention, may be at least in part elastic, and at least in part provided with moisture management properties.

Another advantage of the invention, for example when a pattern of hydrophobic areas is provided in the form of a flexible and elastic film, is that the area ratio between the hydrophilic and hydrophobic areas remains constant during and/or after the stretching of the fabric.

Exemplary embodiments of fabrics according to the invention, suitable for garment making, can have a hydrophobic area/total fabric area ratio ranging from 20% to 60%, preferably 20% to 50%. In particular, a hydrophobic area/total fabric area ratio of 25-30% is preferred for performance apparel, such as, for example, garments suitable to be used during sport and physical exercising.

For example, a fabric according to the invention can be a uni-stretch fabric (a fabric stretchable along one direction, e.g. along the warp direction or the weft direction), a bi-stretch fabric (a fabric stretchable along two directions, generally two orthogonal directions, such as, for example, along both the warp and weft direction), or a multiple-axis stretchable fabric.

In an embodiment, the hydrophilic agent extends from said first side to the second side of the fabric and throughout the body of the fabric. In this preferred embodiment, the water absorption and transport through the cross-section of the fabric, from the first side to the second side of the fabric is particularly accelerated.

Other advantages of the fabric according to the invention are, for example, that the application of at least one hydrophilic agent, for example, may provide a protection of the dye which already exists on the fabric, preventing abrasion of the dye underneath. Moreover, if a dye has to be applied when the fabric has been already provided with the hydrophilic agent, the hydrophilic agent allows a higher dye uptake if compared to a fabric which is not provided with at least one hydrophilic agent. A further advantage is that the application of at least one hydrophilic agent provides for a better "hand", i.e. a higher quality perception, to the fabric.

In a preferred embodiment, said hydrophilic agent and said hydrophobic agent are compatible with each other.

With the term "compatible" it is hereby indicated that both the hydrophilic agent and the hydrophobic agent can be applied to the fabric in two successive steps without additional intermediate steps between providing the hydrophilic agent and the hydrophobic agent.

In other words, a hydrophilic agent may be provided to the fabric and, subsequently, a hydrophobic agent can be provided to the fabric; once both the hydrophilic and hydrophobic agents have been applied, the fabric may be treated in order to fix the mentioned agents to the fabric.

In a possible embodiment, the hydrophilic agent and the hydrophobic agent are thermofixed to the fabric and/or crosslinked.

Suitable hydrophilic agents are known in the art; e.g. they may be polysiloxanes, acrylic emulsions, polyurethanes, silicones or aminosilicones or mixtures thereof; the agents may have functional groups selected from the group comprising carboxylates, silicates, sulfonates, sulfates, hydroxyls, phosphates, epoxy, glycol, and mixtures thereof.

Hydrophobic agents suitable for the purposes of the invention are known in the art and may be selected from fluoro-carbon and non-fluoro-carbon hydrophobic agents or their mixtures For example, said hydrophobic agent is selected from the group comprising fluorocarbons, hydrocarbons, silicones, waxes, and mixtures thereof. Examples of hydrophobic and hydrophilic agents are disclosed e.g. in WO 2007/059590 and in EP 1116813.

As mentioned, the hydrophilic agent may extend from said first side to the second side of the fabric and throughout the body of the fabric.

As above mentioned, the fabric of the invention preferably comprises warp yarns and weft yarns; in other words, the fabric of the invention is a woven fabric, preferably an elastic woven fabric.

According to embodiments, the fabric of the invention may be a woven fabric that can be stretched 50% of its initial length, preferably, up to 75% of its initial length, more preferably up to 100% of its initial length, preferably both in weft and warp direction, According to the invention, a preferred fabric is a denim fabric, namely an elastic denim fabric. As above mentioned, a fabric according to the invention can be, advantageously, an elastic fabric. In a preferred embodiment, the fabric is an elastic fabric that can be stretched 50% of its initial length, preferably the elastic fabric can be stretched in at least one direction up to 75% of its initial length, more preferably up to 100% of its initial length. Preferably these stretch values apply both in weft and warp direction. In other words, the fabric of the invention may present the same elasticity (i.e. stretchability) both in weft and warp direction. For example, the fabric of the invention may be stretched 50% of its initial length both along the weft and warp direction. According to other embodiments, the fabric of the invention may present different elasticity in warp and in weft. For example, the fabric of the invention may be stretched 50% of its initial length both along the warp direction, and up to 75% or 100% in weft direction. Stretch values may be measured according to ASTM D3107-(stretch, after 3 home washings).

In ASTM D3107, a sample may be stretched by means of a weight of 3.0 lb or 4.0 lb. It has been proven that there are no significant differences in the test results if either a 3.0 lb or 4.0 lb weight is used. In the present disclosure, stretch according to ASTM D3107 was measured by means of a 3.0 lb weight.

The hydrophilic or hydrophobic nature of the areas of the fabric may be assessed in a known way, e.g. by measuring Water Vapor Transmission Rate of Sheet Materials Using Dynamic Relative Humidity Measurement according to ASTM E398-13.

In a preferred embodiment, the hydrophilic agent extends through the body of the fabric, from one side to the other side of the fabric; hydrophobic areas extend from the first side of the fabric into the body of the fabric without reaching the opposite side of the fabric; preferably, the hydrophobic agent present in the corresponding hydrophobic areas, extends within the fabric for a depth ranging from 5% to 95%, preferably 20%-80%, more preferably 20% to 70%, even more preferably 30% to 60%, and even more preferably 30%-50% of the thickness of said body. According to a preferred embodiment, hydrophilic pathways (i.e. regions of the fabric wherein at least one hydrophilic agent is provided, and no hydrophobic agent is provided) are provided, between hydrophobic areas, through the body of the fabric. Thus, the moisture is absorbed by the hydrophilic areas on the first side of the fabric, and transported to the second side of the fabric through hydrophilic pathways into the body of the fabric.

In this way, the body of the fabric can present a portion (i.e., a region), between the "upper" limit of the hydrophobic pattern, i.e. the limit of the extension depth of the hydrophobic areas into the body of the fabric, and the second side of the fabric, wherein only hydrophilic agent/s are provided.

In an exemplary embodiment of the invention, the thickness of the hydrophobic areas and the extension of each single hydrophobic area through the body of said fabric is different in different hydrophobic areas. In other words, the extension of the pattern of hydrophobic areas through the body of the fabric can be designed according to the fabric in view of the fabric and the wicking effect required.

In a possible embodiment, said pattern of hydrophobic areas comprises hydrophobic areas having the same shape and/or the same dimension. However, in embodiments of the invention, hydrophobic areas can have different shape, geometry, distribution, depth and hydrophilic/hydrophobic area ratio.

In another embodiment, the fabric of the invention may be provided on its first side with an "irregular" distribution and concentration of hydrophilic and hydrophobic areas. Accordingly, the fabric can be provided with regions having a majority of hydrophobic areas, and with other regions wherein a majority of hydrophilic areas is present.

An "irregular" distribution may be obtained by having different distances between the hydrophobic areas.

According to a preferred embodiment, the maximum distance between two adjacent hydrophobic areas ranges from 1.6 to 2.1 mm in all directions.

According to a preferred embodiment the minimum distance between two adjacent hydrophobic areas is in the range of 0.3 to 0.4 mm.

According to an embodiment, an axis which cuts the fabric of the invention along the weft direction or along the warp direction, cuts a plurality of hydrophobic areas that are separated by a plurality of different distance between a hydrophobic area and the adjacent one which is cut by the same axis.

According to a preferred embodiment, the pattern of hydrophobic areas comprises hydrophobic areas in the form of lines having a spiral shape.

Preferably, hydrophobic areas having a spiral shape are provided only to the first side of the fabric, that is the side which contacts the skin of the user in a garment comprising the fabric of the invention.

According to a preferred embodiment, the distance between two adjacent lines of the spiral (i.e. the "coils" of the spiral) is in the above mentioned minimum and maximum ranges of 0.3 to 0.4 mm and 1.6 to 2.1 mm.

Preferably, the distance between the lines of the spiral (i.e. the "coils" of the spiral) increases by moving radially out from the centre of the spiral. Such a spiral shape may resemble the shape of the shell of a snail, to provide a "snail-shell" shaped spiral.

In another embodiment, the spiral, may follow a shape in accordance to the Fibonacci sequence.

Advantageously, hydrophobic areas having irregular distribution, especially areas having a spiral shape, provide a moisture wicking that is particularly fast and effective, and the fabric maintains the moisture wicking effect substantially at all stretch levels.

Without being bound to a specific scientific explanation, it has been observed that hydrophobic pattern having hydrophobic areas with spiral shape, provides a fabric which maintains substantially unaffected its capillary effect when it is stretched, maintaining substantially unaltered its moisture wicking effect. It has been observed that the spiral shape provides for a dynamic change of the distance of the lines of the spiral (and the distance between the different hydrophobic areas), which allows to maintain substantially unaltered the wicking effect of the fabric, even when the fabric is stretched. According to possible embodiments, the areas between the lines (i.e. the "coils") of a hydrophobic area having spiral shape are provided with a hydrophilic agent, i.e. are hydrophilic areas.

According to possible embodiments, there are provided areas having a spiral shape, having different dimensions, namely adjacent hydrophobic areas and/or adjacent hydrophilic areas have not the same dimension.

Additionally, when the hydrophobic areas of the hydrophobic pattern have a spiral shape; the hydrophobic areas having spiral shape may be provided onto the fabric so that areas of the fabric having the same area extension have different hydrophilic/total area ratio.

In exemplary embodiments, the pattern of hydrophobic areas comprises some hydrophobic areas having the same shape, geometry, distribution, depth and some hydrophobic areas having different shape, geometry, distribution, depth.

Another object of the invention is a process for the production of a fabric comprising the following steps:
a. providing a fabric comprising a first side, a second side, and a body extending from said first side to said second side,
b. providing at least one hydrophilic agent on at least some regions of said first side of the fabric, and
c. providing at least one hydrophobic agent at least on said first side of said fabric as a pattern of hydrophobic areas, whereby said first side has a pattern of hydrophobic areas and a pattern of hydrophilic areas, to transfer the moisture from said first side to said second side.

In a preferred embodiment, the hydrophilic agent is provided on the fabric before the hydrophobic agent.

As already discussed above, according to a preferred embodiment of the invention, said regions, where said hydrophobic agent is provided, are at least in part overlapping said hydrophilic areas, to provide hydrophobic areas.

For example, at least one hydrophilic agent can be provided on the fabric and, subsequently, at least one hydrophobic agent can be provided as a pattern of hydrophobic areas, that can partially or entirely overlap with the regions where the hydrophilic agent was applied. According to a preferred embodiment of the invention, the overlapping areas show hydrophobic behavior.

According to embodiments, the fabric may be impregnated with a hydrophilic agent and, subsequently, a hydrophobic agent can be provided to the fabric; once both the hydrophilic and hydrophobic agents have been applied, the fabric is treated to fix the mentioned agents to the fabric.

According to embodiments, the hydrophilic agent and the hydrophobic agent can be fixed to the fabric with a single-step process.

In a preferred embodiment, said hydrophobic areas are in the form of a film on the first side of the fabric; the film is preferably a flexible film or an elastic film.

Preferably, said hydrophilic agent is provided in order to extend from the first side to the second side of the fabric and throughout the body of the fabric.

In an exemplary embodiment, the hydrophilic agent is extending from the first side to the second side of the fabric and throughout the body of the fabric, the hydrophobic agent is provided in the form of discrete patches of continuous film, and is extending from the first side into the body of the fabric for a depth preferably of about 50% of the thickness of the fabric.

The extent to which the hydrophilic agent, as well as the hydrophobic agent, penetrates into the body of the fabric can be adjusted in view of the nature of the fabric to be treated, the required wicking effect and/or the nature of the agent/s to be provided.

Methods and techniques for providing hydrophilic and hydrophobic agents to a fabric are known in the art.

According to a preferred embodiment of the process of the invention, said hydrophilic agent and/or said hydrophobic agent is thermofixed and/or crosslinked to the fabric.

In other words, the hydrophilic agent, or the hydrophobic agent, or both, after having been provided to the fabric, can be thermofixed and/or crosslinked.

In a particularly preferred embodiment, at least one hydrophilic agent is thermofixed to the fabric; preferably, at least one hydrophilic agent is thermofixed to the fabric by means of a single-step process. When crosslinking of the hydrophilic and/or hydrophobic agent has to be performed, a suitable crosslinking agent can be provided.

In a further preferred embodiment, said hydrophilic agent is provided in order to extend through the body of the fabric, and hydrophobic areas are provided to extend from said first side into said body of the fabric for a depth ranging from 5% to 95%, preferably 20% to 80%, more preferably 20% to 70%, even more preferably 30% to 60%, even more preferably 50% of said body's thickness.

For example, a hydrophobic pattern can be applied to a fabric previously treated with a hydrophilic agent to provide hydrophilic pathways through which moisture quickly reaches the second side of the fabric, where the evaporation of the moisture occurs.

The depth to which the agents (hydrophilic and/or hydrophobic) penetrate into the body of the fabric can be varied and selected, in view of the nature of the fabric to be treated and/or the nature of the agent/s to be provided. Methods and techniques for providing a fabric with hydrophilic and hydrophobic agents, i.e. ways to apply the mentioned agents to a fabric, are known in the art.

Still another object of the present invention is a garment comprising a fabric according to the above.

A garment according to the invention can be, but is not limited to, jeans, jackets, trousers, shorts and sport garments in general.

Advantageously, the fabric of the invention is suitable for the production of garments for daily use, without particular limitation to specific garments or to garments for specific use, e.g. sport garments.

The invention will be further disclosed with reference to the following figures that refer to exemplary and non-limiting embodiments and features of the invention.

DETAILED DESCRIPTION

Figure 1:
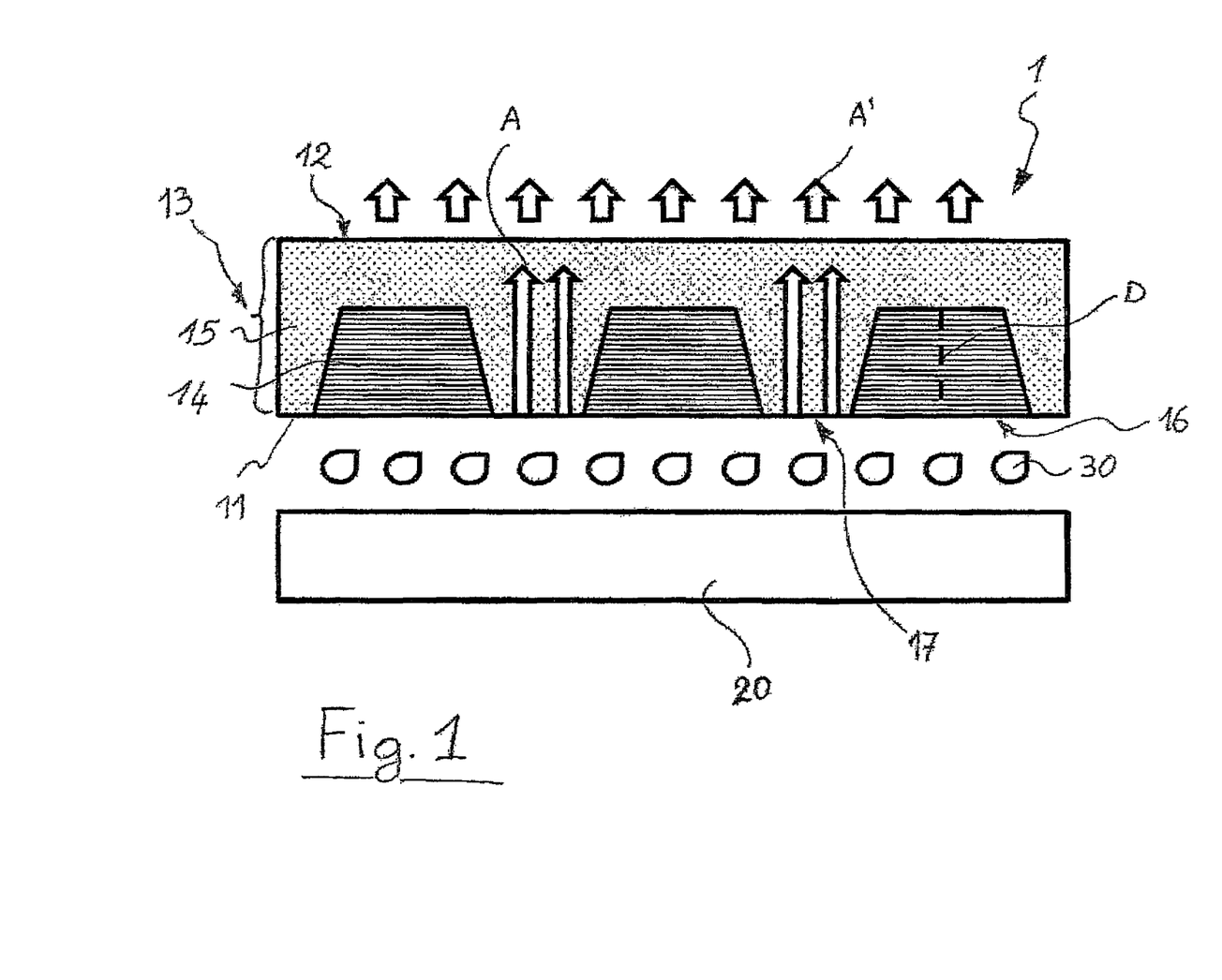
FIG. 1 is a schematic view of the section of a fabric according to the invention placed in contact with the skin of the user.

With reference to FIG. 1, the fabric according to the invention has a first side, a second side, a body extending from said first side to said second side; at least one hydrophobic agent, provided at least on said first side of said fabric as a pattern of hydrophobic areas; at least one hydrophilic agent which is provided on at least some regions of said first side of the fabric, whereby said first side has a pattern of hydrophobic areas and a pattern of hydrophilic areas, to transfer the moisture from said first side to said second side.

In FIG. 1 it is schematically shown a section of a preferred embodiment of the fabric of the invention. Specifically, a fabric 1, having a first side 11, a second side 12 and a body 13, is shown.

In this preferred embodiment, hydrophilic agent 15 extends from the first side 11 to the second side 12 of the fabric 1 and throughout the body 13 of the fabric 1.

Hydrophobic agent 14 is provided on the fabric 1, thus providing hydrophobic areas 16. Hydrophobic areas 16 extend from the first side 11 into the body 13 of the fabric 1 for a depth D (dashed line) of the thickness of body 13. In the embodiment of FIG. 1, all the hydrophobic areas 16 extend into the body 13 of the fabric 1 for the same depth D of the thickness of body 13.

In FIG. 1 is illustrated an embodiment of the fabric 1 according to the invention, wherein the hydrophilic agent 15 extends from the first side 11 to the second side 12 of the fabric 1 and throughout the body 13 of the fabric 1; in other words, fabric 1 is impregnated with the hydrophilic agent 15. In other embodiments, the hydrophilic agent 15 may be provided only on some regions of the first side 11 of the fabric 1.

The hydrophilic agent 15, can therefore be provided on some regions of the first side 11 of the fabric 1 and can extend from the first side 11 throughout the body 13 without reaching the second side 12 of the fabric 1.

FIG. 1 shows that first side 11 of fabric 1, is provided with a pattern of hydrophobic areas 16. Between the hydrophobic areas 16, a pattern of areas provided with the hydrophilic agent 15, i.e. a pattern of hydrophilic areas 17, is shown.

For clarity, in FIG. 1, the fabric 1 is shown to be closer to the user's skin 20; however, the fabric 1 can directly contact the skin of the user.

The moisture 30 (herein shown as "droplets"), which forms between the skin 20 and the first side 11 of the fabric 1, is absorbed into the body 13 of the fabric 1 at the level of the hydrophilic areas 17 of the first side 11, i.e. the areas that are provided with the hydrophilic agent 15. Hydrophobic areas 16 repel the moisture 30, which therefore concentrates in correspondence of the areas of the first side 11 that are provided with the hydrophilic agent 15. The moisture 30 is absorbed into the body 13 of the fabric 1, and is transported through the body 13 of the fabric 1 by means of hydrophilic pathways, defined by the hydrophilic agent 15.

The route followed by the moisture 30, from the first side 11, throughout the body 13, up to the second side 12 of the fabric 1, is schematically indicated by the arrows A. Arrows A' schematically represents the evaporation of moisture 30 which occurs at the level of second side 12 of the fabric 1.

As above mentioned, hydrophobic areas 16 extend from said first side 11 into said body 13 of the fabric 1 for a depth D. Depth D can range from 5% to 95%, preferably 20% to 80%, more preferably 20% to 70%, even more preferably 30% to 60%. A most preferred value is about 50% of said body's 13 thickness. Depth D of the hydrophobic areas 16 can be designed according to the moisture management features desired.

Figure 2A:
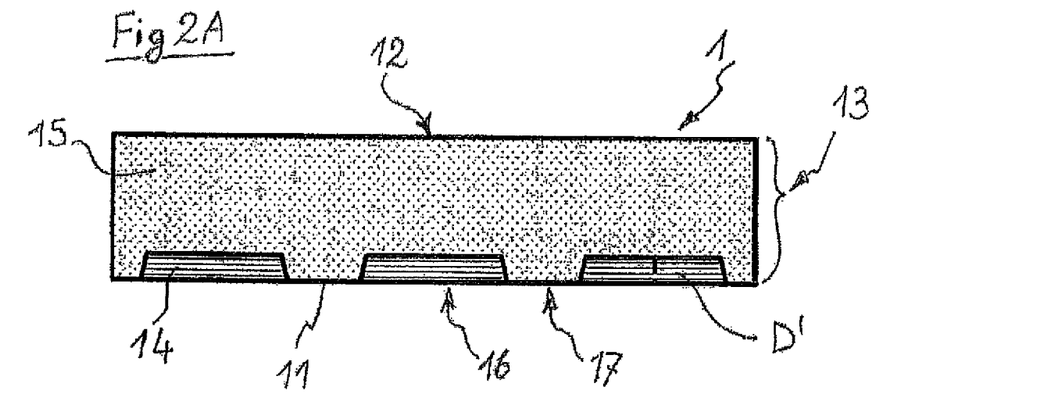
FIGS. 2A, 2B and 2C are schematic views of the section of three embodiments of the fabric of the invention.
Figure 2B:
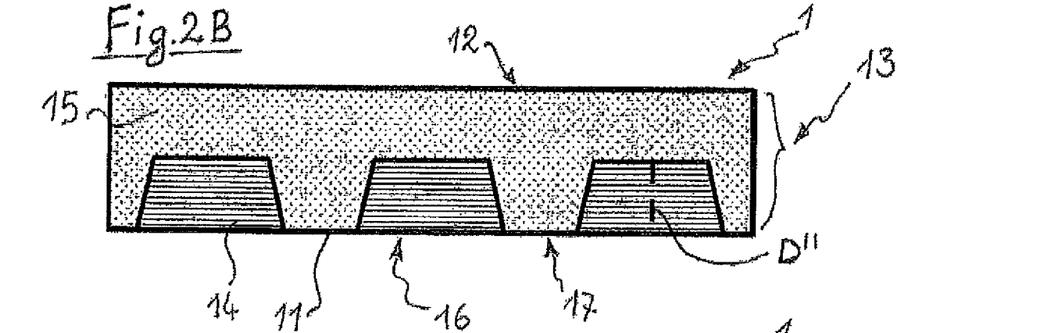
Figure 2C:
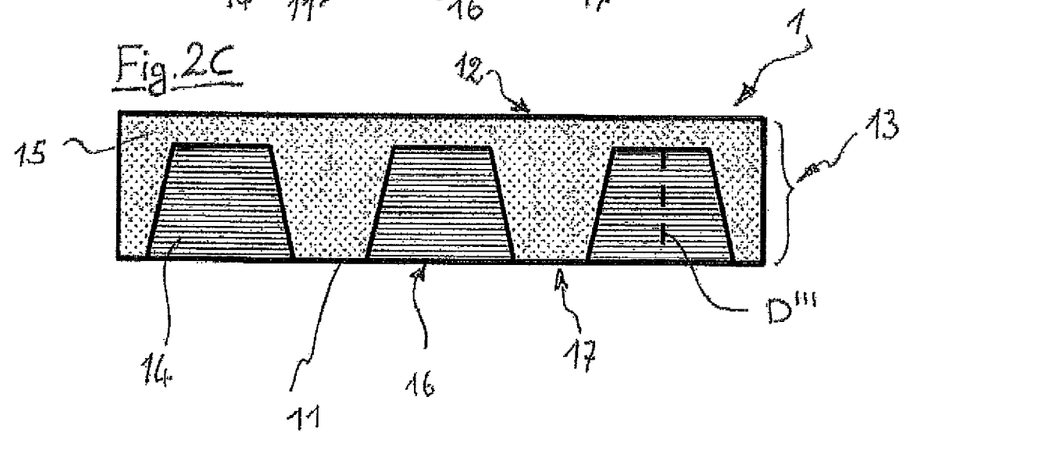

FIGS. 2A, 2B and 2C show three embodiments of the fabric 1 of the present invention. In particular, in FIGS. 2A, 2B and 2C, hydrophilic agent 15 extends from the first side 11 to the second side 12 of the fabric 1 and throughout the body 13 of the fabric 1. Hydrophobic agent 14 is provided on the fabric 1, thus providing hydrophobic areas 16. A pattern of hydrophilic areas 17 is present between the hydrophobic areas 16.

In FIGS. 2A, 2B and 2C, the provided hydrophobic areas 16 can extend from the first side 11 into the body 13 of the fabric 1 for depth D', D" and D''' (dashed lines) of the body's 13 thickness, different for each embodiment of the fabric 1.

For example, in FIG. 2A, depth D' is about 20% of the body's 13 thickness; in FIG. 2B, depth D" is about 50% of the body's 13 thickness, and in FIG. 2C, depth D''' is about 80% of the body's 13 thickness. In the embodiments of fabric 1 illustrated in FIGS. 2A, 2B and 2C, all the hydrophobic areas 16 have, in each embodiment, the same depth D' or D" or D'''.

Additionally to the depth for which the pattern of hydrophobic areas extends into the fabric's body's thickness, the hydrophobic areas may have several different shapes, and/or dimensions and/or distribution in the fabric.

Figure 4A:
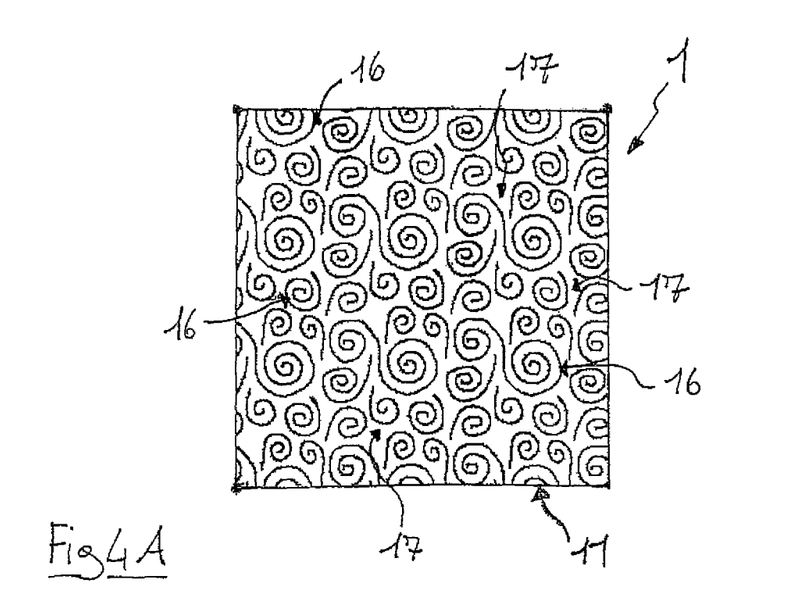
FIGS. 4A, 4B and 5 are schematic representations of the top view of embodiments of the fabric having hydrophobic areas with spiral shape.
Figure 4B:
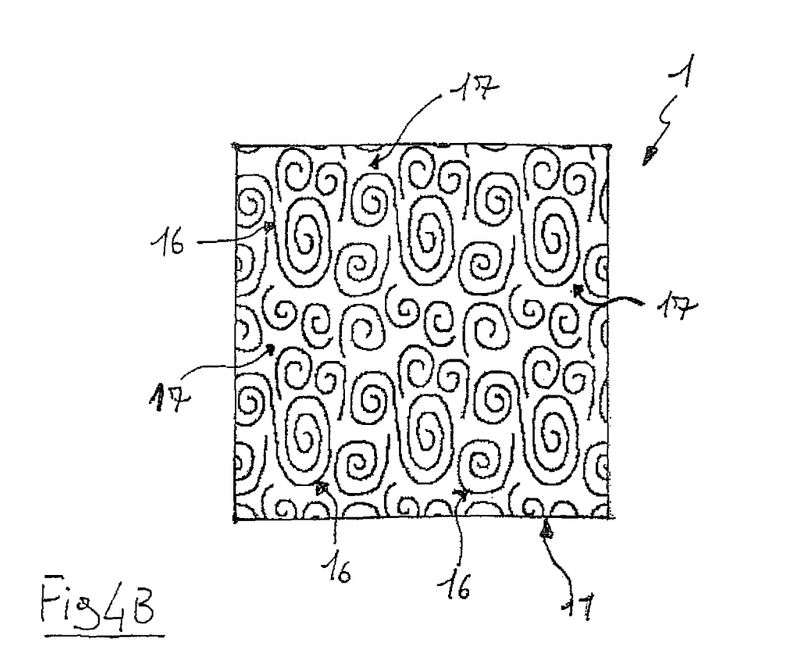

For example, the hydrophobic areas 16 of the hydrophobic pattern may have a spiral shape; namely, the first side 11 may present hydrophobic areas 16 having a spiral shape, as shown in FIGS. 4A-4B.

Furthermore, considering, for example, the first side of the fabric, also the hydrophilic areas/hydrophobic areas ratio can be designed according to the moisture management features desired.

Figure 3A:
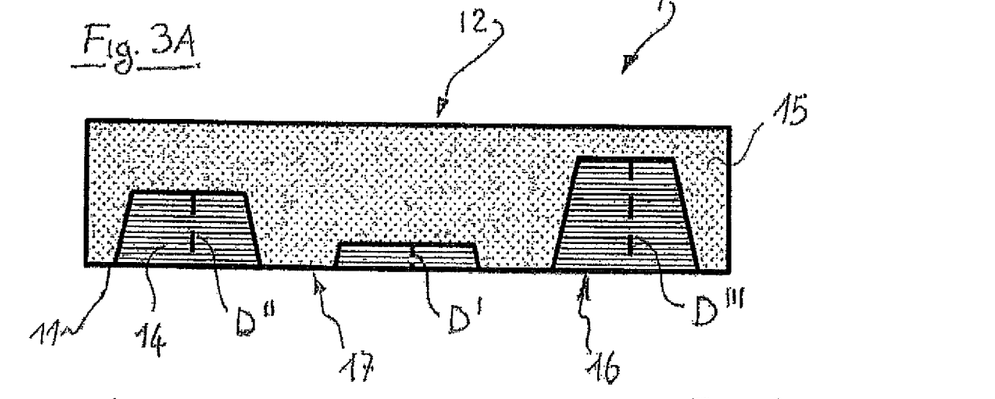
FIGS. 3A, 3B and 3C are schematic views of the section of three embodiments of the fabric of the invention.
Figure 3B:
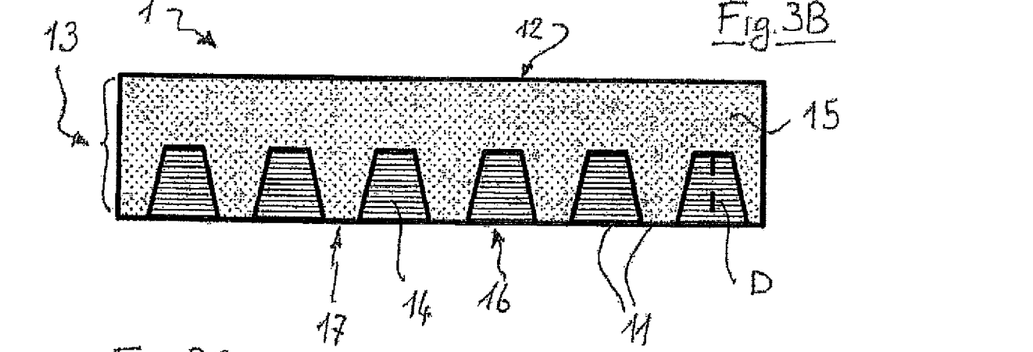
Figure 3C:
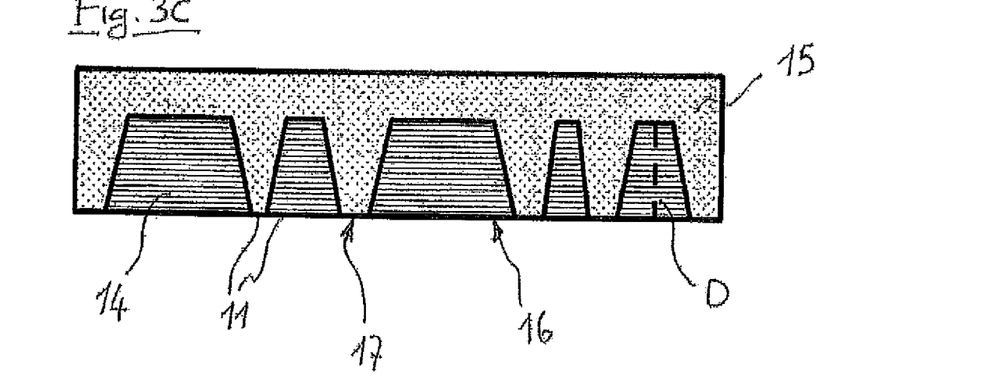

FIGS. 3A, 3B and 3C show three other embodiments of the fabric 1 of the invention.

In FIGS. 3A, 3B and 3C, hydrophilic agent 15 extends from the first side 11 to the second side 12 of the fabric 1 and throughout the body 13 of the fabric 1. Hydrophobic agent 14 is provided on the fabric 1, thus providing hydrophobic areas 16. A pattern of hydrophilic areas 17 is present between the hydrophobic areas 16.

FIG. 3A shows that different hydrophobic areas 16 can extend from the first side 11, into the body 13 of the fabric 1 for a different depth D', D" or D'" (dashed lines) of the thickness of body 13, in the same fabric 1.

In FIG. 3B is shown an embodiment of fabric 1, wherein all the hydrophobic areas 16 in the fabric 1 extend from the first side 11, into the body 13 of the fabric 1, for the same depth D (dashed line) of the body's 13 thickness. FIG. 3B shows a fabric 1 wherein hydrophobic areas 16 are smaller and more numerous in comparison with the fabric 1 of, for example FIGS. 2A-2C and 3A and 3C.

Therefore, hydrophobic areas 16 can have different dimension, according to the moisture management features required.

In FIG. 3C is shown a fabric 1 in which all the hydrophobic areas 16 in the fabric 1 extend from the first side 11, into the body 13 of the fabric 1, for the same depth D (dashed line). FIG. 3C shows a fabric 1, where the hydrophobic areas 16 have a not homogeneous distribution in the fabric 1, and have also different dimensions.

For example, in a preferred embodiment, the fabric of the invention can be provided, for example, on its first side, with an "irregular" distribution and concentration of hydrophilic and hydrophobic areas. For example, when the hydrophobic areas of the hydrophobic pattern have a spiral shape, the hydrophobic areas having spiral shape may be distributed on the fabric (e.g. on the first side of the fabric) in order to provide a fabric wherein adjacent hydrophobic areas and/or adjacent hydrophilic areas have not the same dimensions.

Therefore, in embodiments, the fabric can be provided with regions wherein a majority of hydrophobic areas is present, and with other regions wherein a majority of hydrophilic areas is present.

Figure 5:
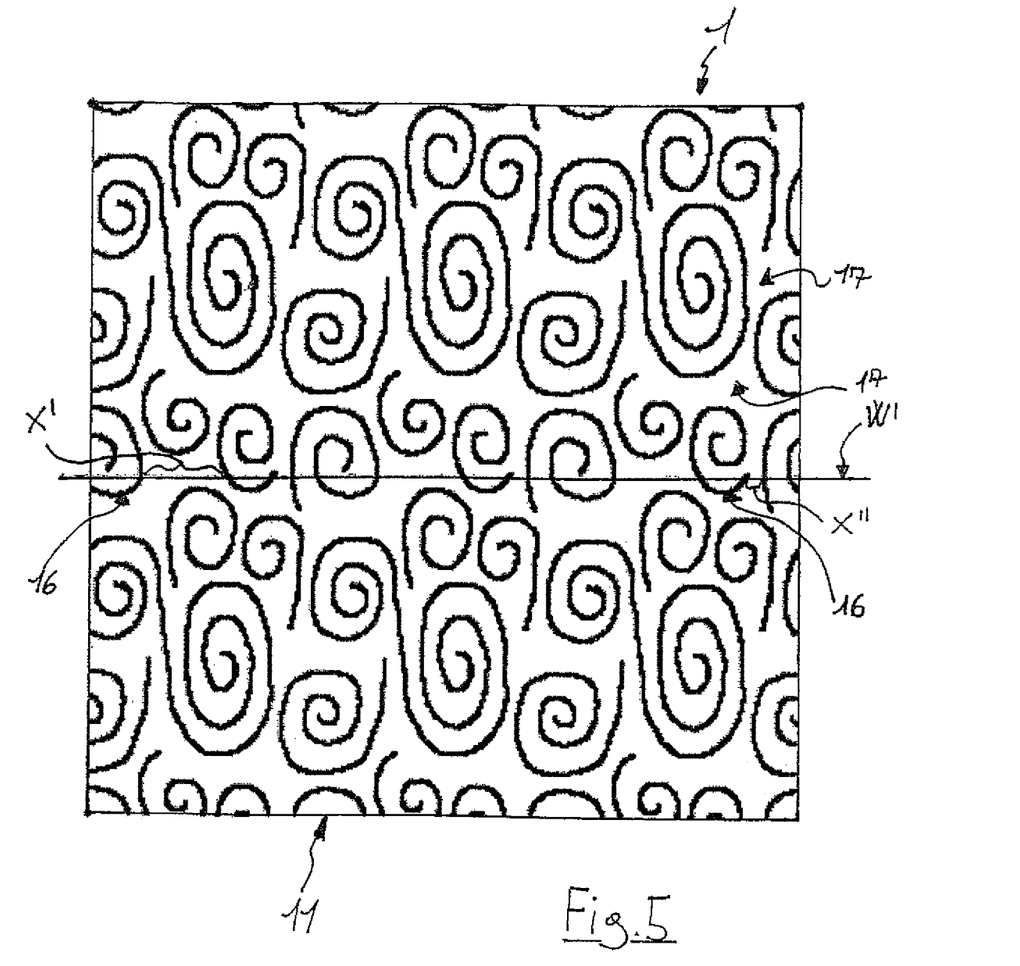

FIGS. 4A, 4B and 5 show embodiments of the fabric having hydrophobic areas comprising lines having a spiral shape.

FIGS. 4A, 4B and 5 shows two embodiments of the fabric 1, wherein a pattern of hydrophobic areas 16 having a spiral shape have been provided. In FIGS. 4A, 4B and 5, hydrophobic areas 16 are applied on the first side 11 of the fabric 1. FIGS. 4A, 4B and 5 show that hydrophobic areas 16, which have a spiral shape, may have different structures and different dimensions (i.e. extension) in the same fabric 1.

Additionally, 4A shows an embodiment wherein the hydrophobic area/total fabric area ratio is higher than in FIG. 4B.

For sake of simplicity, FIGS. 4A, 4B and 5 shows an embodiment wherein the first side 11 of the fabric 1 has been provided with a hydrophilic agent 15 to provide hydrophilic areas 17: in other words, in FIGS. 4A, 4B and 5, between and around hydrophobic areas 16, and between the lines (i.e. the "coils") of the hydrophobic spirals, hydrophilic areas 17 are provided.

As above mentioned, when the hydrophobic areas 16 of the hydrophobic pattern have a spiral shape; the hydrophobic areas 16 having spiral shape may be provided to the fabric so that areas of the fabric having the same extension have different hydrophilic/total area ratio.

In FIG. 5 an axis W', which cuts the fabric of the invention along the weft direction, is shown. FIG. 5 shows that an axis which cuts the fabric of the invention along the weft direction (or, according to different embodiments, along the warp direction), cuts a plurality of hydrophobic areas 16 that are separated by a plurality of different distance X'; X" between a hydrophobic area and the adjacent one which is cut by the same axis W'.

In particular, FIG. 5 shows that axis W' cuts two hydrophobic areas 16 that are separated by a first distance X', and also cuts two other hydrophobic areas 16 separated by a second distance X", which is smaller than first distance X'.

Suitable methods for applying the agents to the fabric are, for example, impregnating the agent into the fabric, for the hydrophilic agent, and screen printing, for the hydrophobic agent. The agents are preferably applied to the fabric after its removal from the loom and before the fabric undergoes a washing; in other words, the pattern of the two agents is applied to a fabric before it is shrunk. It should also be noticed that the hydrophobic spiral pattern could be applied on a fabric free from hydrophilic agents. According to an embodiment, the above discussed spiral pattern could include or by replaced by open curved lines that do not follow a spiral shape, provided the same effect of maintaining capillarity when the garment is stretched is obtained.

The invention also provides a garment comprising a fabric as above disclosed; a garment comprising the fabric of the invention is provided with the moisture management features of the fabric.

In some embodiments, in a garment, the fabric of the invention is confined to specifically selected parts of the garment; the rest of the garment can be therefore made of any other suitable material.

As discussed above, the fabric of the invention can be provided with different moisture management features and efficiency, which can be modulated by adjusting some parameters, such as, for example, the geometry, shape, dimension, distribution and depth of, for example, the pattern of hydrophobic areas.

Therefore, in a preferred embodiment, a garment can be made of a "patchwork" of different embodiments of the fabric of the invention, thus providing to different parts of the garment, different moisture management feature.

In another embodiment, a garment according to the invention can be made of a fabric according to a single embodiment, i.e., the fabric has the same moisture management features over the all garment.

The invention claimed is:

1. A fabric (1), having a first side (11), a second side (12), a body (13) extending from said first side (11) to said second side (12); at least one hydrophobic agent (14), provided at least on said first side (11) of said fabric (1) as a pattern of hydrophobic areas (16),
   wherein said fabric (1) comprises:
   at least one hydrophilic agent (15) which is provided on at least some regions of said first side (11) of the fabric (1), whereby said first side (11) has the pattern of said hydrophobic areas (16) and a pattern of hydrophilic areas (17), to transfer moisture (30) from said first side (11) to said second side (12), wherein said pattern of hydrophobic areas (16) comprises hydrophobic areas (16) having a spiral shape which extend from said first side (11) into said body (13) of the fabric (1) for a depth (D) ranging from 20% to 80% of the thickness of said body (13); and wherein said fabric (1) is an elastic woven fabric that can be stretched up to 100% of its initial length in at least weft or warp direction measured according to ASTM D3107.

2. The fabric (1) according to claim 1, wherein said hydrophobic areas (16) comprise a hydrophobic agent (14) and a hydrophilic agent (15).

3. The fabric (1) according to claim 2, wherein said hydrophobic areas (16) comprise a film on the first side (11) of the fabric (1).

4. The fabric (1) according to claim 1, wherein the minimum distance between two adjacent said hydrophobic areas (16) is in the range of 0.3 to 0.4 mm.

5. The fabric (1) according to claim 1, wherein the maximum distance between two adjacent said hydrophobic areas (16) is in the range of 1.6 to 2.1 mm.

6. The fabric (1) according to claim 1, wherein said hydrophilic agent (15) and/or said hydrophobic agent (14) is thermofixed to the fabric (1) and/or crosslinked.

7. The fabric (1) according to claim 1, wherein said fabric (1) is an elastic woven fabric that can be stretched up to 100% of its initial length, both in weft and warp directions.

8. The fabric (1) according to claim 1, wherein said hydrophilic agent (15) extends through the body (13) of the fabric (1) and wherein said hydrophobic areas (16) extend from said first side (11) into said body (13) of the fabric (1) for a depth (D) ranging from 20% to 70% of the thickness of said body (13).

9. The fabric (1) according to claim 1, wherein said hydrophobic areas (16) extend through said body (13) of said fabric (1) for different depths (D).

10. The fabric (1) according to claim 1, wherein said elastic woven fabric (1) is a denim fabric.

11. The fabric (1) according to claim 1, wherein said pattern of hydrophobic areas (16) has an irregular distribution on said first side (11) of said fabric (1).

12. The fabric (1) according to claim 1, wherein said pattern of hydrophobic areas (16) comprises hydrophobic areas (16) having at least one of the same shape and the same dimension.

13. A garment comprising a fabric (1) according to claim 1.

14. The garment according to claim 13, wherein said pattern of hydrophobic areas (16) comprises hydrophobic areas (16) having at least one of different shapes and different dimensions in different areas of the garment.

15. The garment according to claim 13, wherein the elastic woven fabric (1) is a denim fabric.

* * * * *